United States Patent [19]
Campbell, Jr.

[11] 4,304,267
[45] Dec. 8, 1981

[54] INTERLOCKING REFRACTORY FOR COVERING A PIPE

[76] Inventor: Frank Campbell, Jr., 2274 Broadlawn Dr., Houston, Tex. 77058

[21] Appl. No.: 173,211

[22] Filed: Jul. 30, 1980

Related U.S. Application Data

[63] Continuation-in-part of Ser. No. 950,633, Oct. 12, 1978, Pat. No. 4,228,826, and a continuation-in-part of Ser. No. 4,629, Jan. 19, 1979, abandoned, and a continuation-in-part of Ser. No. 15,497, Feb. 26, 1979, abandoned.

[51] Int. Cl.³ .............................. F16L 9/14; F27B 9/24
[52] U.S. Cl. .................................... 138/149; 138/155; 432/234
[58] Field of Search ............... 138/140, 149, 177, 178, 138/155, DIG. 11; 432/233, 234

[56] References Cited
U.S. PATENT DOCUMENTS

| | | | |
|---|---|---|---|
| 3,572,662 | 3/1971 | Weaver et al. | 432/234 |
| 3,941,160 | 3/1976 | Campbell | 138/149 |
| 3,986,528 | 10/1976 | Green | 138/177 |
| 4,095,937 | 6/1978 | Colburn et al. | 138/149 X |

OTHER PUBLICATIONS

Babcock & Wilcox Brochure, entitled "Kaowool Ceramic Fiber Products-Vacuum Formed Shapes", 1 Dec. 1970.

*Primary Examiner*—James E. Bryant, III
*Attorney, Agent, or Firm*—Fulbright & Jaworski

[57] ABSTRACT

A light-weight, thermally resistant, shock-resistant refractory for covering a water pipe in a high-temperature environment. The refractory shape is a partial cylinder including a body segment, two protuberances spaced apart from and on either side of the body segment by corresponding recesses and terminating in a void between the two protuberances. Two identical segments, when axially aligned in juxtaposition, are fitted together around a pipe such that the body segment of each refractory shape is intimately received by the corresponding void of the opposite refractory shape and the pair of protuberances of one shape are closely received and interlocked with the corresponding pair of recesses in the opposing shape to form a substantially cylindrical refractory covering around the pipe. The shape requires no additional means to support itself around the pipe.

10 Claims, 7 Drawing Figures

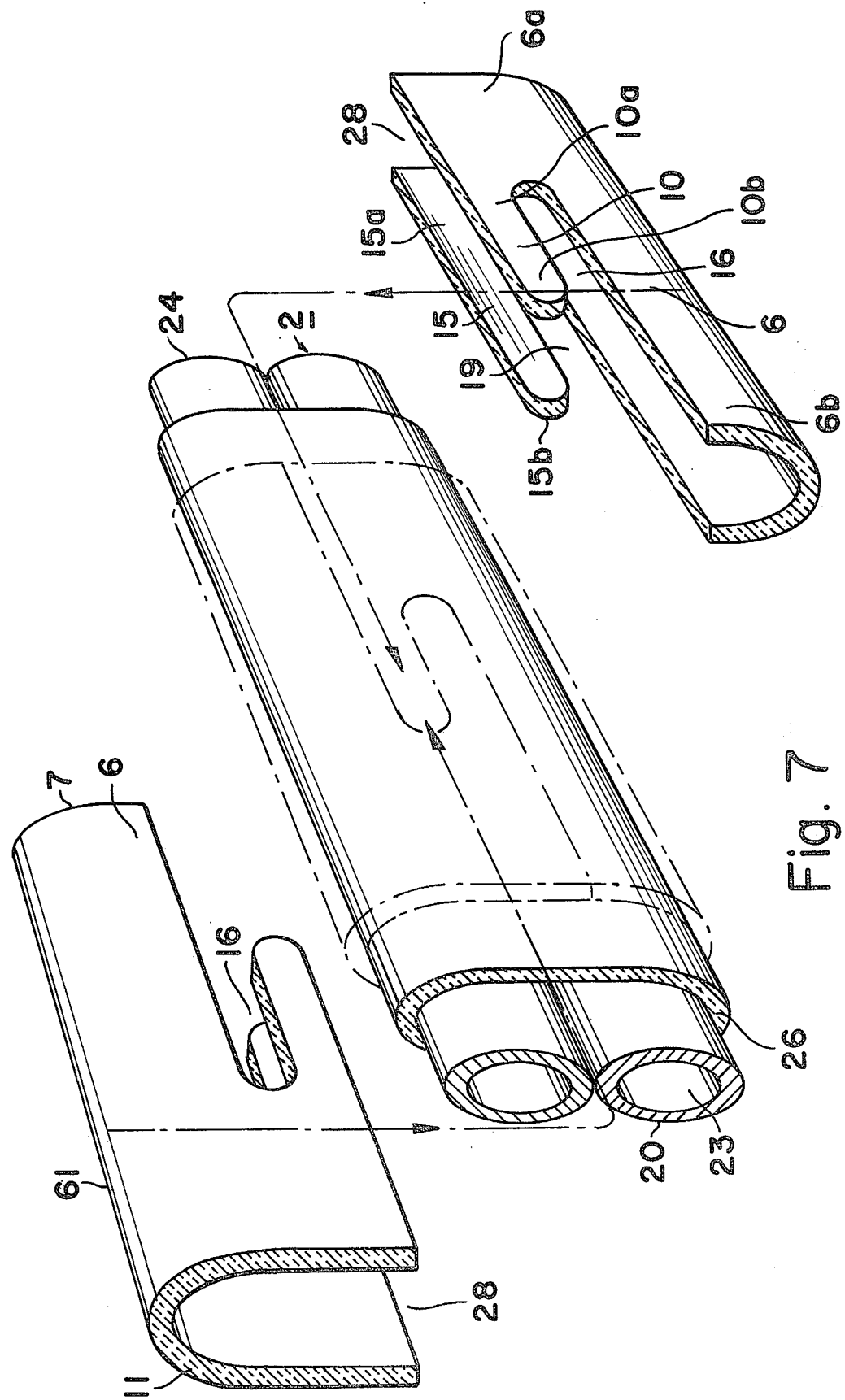

INTERLOCKING REFRACTORY FOR COVERING A PIPE

CROSS REFERENCES

This application is a continuation-in-part of U.S. application No. 950,633, entitled "Interlocking, Laminated Refractory for Covering a Pipe and Method of Manufacture" filed Oct 12, 1978, now U.S. Pat. No. 4,228,826, and U.S. Continuation-In-Part application No. 004,629 entitled "Interlocking, Laminated Refractory for Covering a Pipe and Method of Manufacture" filed on Jan. 19, 1979, now abandoned, and a continuation of Ser. No. 015,497 filed Feb. 26, 1979, now abandoned.

BACKGROUND OF THE INVENTION

In furnaces used throughout the metallurgical and related industries to heat a slab, billet, bloom or other raw steel shape, a typical furnace includes a complex network of vertical and horizontal water-cooled pipes which support an additional network of horizontal water-cooled skid rails along which the slabs, billets, blooms, or other raw steel shapes are pushed or walked through the furnace. The metallurgical furnace is an open system; that is, heat which is transferred to the metal pipe network is conducted by the flowing water in the pipes to a point outside the furnace and is not recoverable. Accordingly, vast amounts of heat losses occur and correspondingly unnecessary amounts of energy are expended to replace the heat loss as a result of the heat transfer into the water-cooled pipe network. For example, as much as thirty to thirty-five percent of the total heat supplied to a metallurgical furnace by the combustion of fuels is lost in an infrastructure of uninsulated skid pipes and the supporting pipe network. For a 4½ inch OD uninsulated water-cooled pipe in a furnace operating at 2400°-2500° F., the heat loss is approximately 115,000-120,000 Btu per lineal foot per hour. For a furnace having 200 feet of skid pipe, 200 feet of horizontal support and 200 feet of vertical support pipe, the heat loss is thus approximately 600×117,500 Btu/hour or 70,500,000 Btu per hour. Hence, the more effective the insulator or refractory around the pipe network, the more efficient and the more economical is the furnace to operate..

To date, various types of refractory materials have been utilized in order to reduce the amount of heat loss from the furnace through the water-cooled pipe infrastructure. The use of pre-fired or chemically bonded refractory materials which are welded, studded, wired, clipped or anchored with interlocking anchor straps is well known. The use of welds, studs, wires and the like requires large expenditures of labor and time to strip the pipe and secure an additional refractory as a replacement. Moreover, refractory concretes have even been formed in place around the pipe surfaces which are supported by any number and type of metallic anchors welded to the pipe surface. Almost without exception these forms of insulation have failed within a relatively short period of operation because of the inherent friability and susceptibility to fracture of the heavy, brittle fired ceramic refractory materials. As the metallic shape is moved along the metal skid rail, significant vibration and flexion of the water-cooled pipe infrastructure occur which are in turn transmitted into the friable, dense, rigid ceramic insulators. High temperature ceramic fiber blankets in the form of split rings, modules or simple wrappings have also been utilized as a means of insulating the pipe infrastructure. The use of ordinary high temperature ceramic fibers and ceramic fiber blankets as insulators around the water-cooled pipe has proven unsatisfactory for a number of reasons: first, the ordinary high temperature ceramic fiber blanket is susceptible to chemical reaction with scale and slag which is produced during the furnace operation; second, ordinary ceramic fiber blankets are inherently susceptible to erosion by the velocities of the gases within the furnace; and third, the ceramic fiber blankets have been difficult to attach to the pipe and suffer a notable shrinkage due to the high temperatures of the furnace.

Covering the ceramic fiber blanket with a rigid preburned ceramic tile refractory has proven less than desirable. Fractures in the refractory and the failure to form an intimate fit among the refractory segments has in effect exposed the ceramic fiber blanket underneath to the deleterious effects of the furnace noted above. Furthermore, the high specific weight of the preburned ceramic tile refractory has compressed the blanket underneath and has further chafed holes in the blanket from the movement of the tile on the blanket as the pipe is vibrated and flexed during furnace operations.

STATEMENT OF THE PRIOR ART

The following statement of the prior art is filed pursuant to 37 C.F.R. 1.97 and 1.98 and represents the most pertinent prior art of which the applicant is aware. In accordance with 37 C.F.R. 1.98(b), photocopies of the patents mentioned below are appended hereto.

| U.S. Pat. No. | Name |
| --- | --- |
| 3,941,160 | Campbell |
| 3,451,661 | Barker |
| 4,015,636 | Van Fossen |
| 3,754,948 | Ash |

The device in the 3,941,160 patent relates to a dense, preburned ceramic refractory formed in interlocking shapes which are positioned by a number of studs 35 welded to the pipe which are received by the arcuate recesses 17 and the refractory shape. A ceramic blanket is positioned between the water pipe and the preburned ceramic tile. The device in the 3,941,160 patent weighs approximately 35 to 40 pounds per lineal foot and is rather rigid. Hence, vibrations in the furnace are transmitted to the preburned ceramic tile and frequently induce fracture along the interlocking portions. The massive weight of the preburned ceramic tile also induces the fracture of the studs which support the refractory. In both cases, the great weight of the refractory on the ceramic blanket underneath in combination with furnace vibrations compresses the blanket, chafes holes within the blanket and generally reduces the thermal barrier characteristics of the blanket. The inventor of the 3,941,160 device, who is also the applicant herein, has discovered that because of the weight of the preburned ceramic tile, the length of the refractory is limited to relatively short elements as is the length of its interlocking portion. Thus, the interlocking characteristics of the segments is less than desirable and sufficient seams occur along the fitted pieces which allow high velocity, high temperature gases and slag to pass through and to attack and destroy the blanket underneath.

The device in the 3,451,661 patent involves an interlocking outer refractory layer unsupported by studs welded to the pipe. The amount of time and labor expended in interlocking the numerous outer pieces is significant as is the number of seams defined by the individual pieces.

The 4,015,636 device again uses a preburned ceramic tile material having an inner layer of semi-cylindrical tiles held together on the pipe by a "C"-shaped ceramic refractory collar which is slid over the split tiles as they are held together. Again, the labor and time expended in insulating the pipe is less than satisfactory. The rigidity and weight of the device permits the transmission of vibrations and flexion of the pipe to the refractory which causes fracture of the refractory and deformation and wear of the insulating blanket underneath the tiles.

The 3,754,948 patent relates to a refractory composition comprising a mixture of mineral wool and ceramic fiber, without regard to a particular shape of any refractory. As noted in the patent itself, mineral wools operate in a relatively low temperature range, above which temperature shrinkage becomes unacceptable. The 3,754,948 patent itself explains that when temperatures in excess of 1,562° F. (850° centigrade) are encountered, the mineral wool must be replaced with a ceramic fiber. Hence, because temperatures of 2,400°-2,500° F. are frequently encountered in a metal-lurgical furnace, the use of a mineral wool-ceramic fiber admixture as an outer refractory is undesirable.

SUMMARY OF THE PRESENT INVENTION

The present invention relates to an interlocking refractory shape for a water-cooled pipe in a high temperature environment. The refractory covering in its commercial form includes two refractory shapes interlocked with one another around the pipe. Each shape further includes a partial cylindrical wall which is termed a body segment for purposes of this application, and a pair of protuberances which are angularly spaced apart from the body segment by a corresponding pair of recesses. The body segment, protuberances and corresponding recesses of each shape all lie substantially in the same cylindrical surface of revolution so that the two shapes segments can be fitted together around a pipe to form an interlocking, cylindrical refractory shape which effectively insulates the water-cooled pipe inside the furnace. A series of interlocking shapes are fitted together as a unit in order to insulate an entire pipe.

The refractory shape is made from light-weight ceramic fibers which are highly resistant to heat flow. The ceramic fiber refractory is much lighter in weight and is less brittle than the conventional preburned ceramic tiles and allows each pair of interlocking shapes to be longer longitudinally and to have a greater interlock surface area than previous interlocking cylindrical shapes made of preburned ceramic tiles. Hence, a more intimate fit is obtained which reduces the deleterious effects of high temperature convection and slag migration through the seams of the refractory which quickly destroy the effectiveness of a ceramic blanket located between the water-cooled pipe and the refractory shape. The novel combination of the shape and light weight ceramic fibers also permits the shapes to be applied to the pipe without any additional means to secure them to the pipe.

An even more intimate fit can be obtained by tapering the protuberances and the corresponding recesses so that the more forcefully the shapes are urged together, the more intimate is the fit between the segments.

The present invention includes a vacuum molded, ceramic fiber construction suitable for continuous use in a conventional reheat furnace. For reasons of economy, a blend of ceramic fibers having differing thermal resistance and slag resistance is used in order to achieve a homogeneous refractory which is sufficiently resistant to furnace gases and corrosive slags. Although a separate inner ceramic fiber blanket positioned between the ceramic fiber shape and the water-cooled pipe is not necessary to the present invention, it assists to reduce even further the heat flow from the furnace to the water-cooled pipe and to act as a damper against vibrations and flexion in the pipe network which historically have shortened the effective life of a refractory covering.

The use of a light-weight, ceramic fiber refractory reduces the crushing forces on the inner blanket which historically have resulted from the massive weight of the preburned ceramic tiles. The reduction of the crushing forces, which forces compact and chafe the fiber blanket, extends both the useful life and the thermal effectiveness of the fiber blanket. Moreover, the coefficient of thermal conductivity of ceramic fiber is significantly lower than the prefired ceramic tiles presently in use. Hence, the resulting insulator is significantly more effective than present refractories in use with metallurgical furnaces.

The manufacture of the refractory shape utilizes a perforated mold whose perforations are in communication with a vacuum source. A suitable slurry is formed and can be maintained at room temperature. The slurry includes a mixture of conventional basic fiber bulk material, a binder including a colloidal silica or colloidal alumina, a starch and a quantity of water. As the perforated vacuum mold is inserted into the slurry, the colloidal silica, a relatively small portion of the starch bond system and a majority of the water are drawn through the perforations while the ceramic fibers tend to form a bonded mat around the perforated mold. When the desired thickness is achieved, the perforated mold is removed from the slurry. The exact ratio of the various fibers will depend upon the furnace temperatures encountered, the desired thickness of the refractory shape and is further affected by considerations of economy; that is, higher temperature and slag resistant, low thermally conductive fibers are more expensive than fibers having lower temperature and slag resistance but which possess a low thermal conductivity.

When the refractory is formed to the desired thickness, it is removed from the slurry. The perforated mold is removed from the refractory shape. The refractory shape is preferably placed upon a mandrel to maintain the shape of the refractory as it is cured in an oven and any necessary machining and cutting is performed. If the refractory is formed as a cylinder instead of two individual shapes, the cylindrical shape can then be cut to produce two shapes which are interlocking. The energy required to cure the vacuum-formed, ceramic fiber refractory is significantly less than the energy required to cure conventional preburned ceramic tile shapes. The resulting new refractory shape eliminates the need for the welding of metal studs to the pipe in order to anchor the refractory and the need to cement or band conventional semi-circular insulators presently used on water-cooled pipes. Hence, the labor expended on the installation of the refractory as described and claimed herein is remarkably reduced.

A single layer refractory requires less labor input during the vacuum forming and hence can be less expensive to manufacture than a laminated refractory, even though the inner layer of the laminated can be formed from a relative inexpense fiber bulk. Moreover, the lack of ceramic fiber interlace between laminations may form a discontinuity which can cause separation of the layers under extreme conditions.

Another form of manufacture of the present invention includes a continuous spectrum of vacuum-formed, ceramic fiber materials having varying characteristics of thermal conductivity which produces a fiber refractory having greater thermal and slag resistance at the outer surface than the inner surface. Such a construction can be obtained by rotating a female cylindrical mold so that the more dense, thermally resistant fiber mterials migrate toward the outer portions of the refractory shape while the lighter, less thermally conductive fibers remain at the inner portions of the shape. Similarly, a female mold can be rotated while a more expensive, low thermally conductive material is applied to the mold as the content of the material being applied is altered to include an increasing amount of a less expensive, more thermally conductive ceramic fiber material.

It is therefore an object of the present invention to provide a refractory shape suitable for insulating water-cooled pipes in a metallurgical furnace which is made of a light-weight ceramic fiber material having an overall low coefficient of thermal conductivity.

Another object of the present invention is to provide a low-density, vacuum-formed ceramic fiber refractory which is positioned around a water pipe without the use of additional anchoring devices such as metal studs welded to the pipe.

Still another object of the present invention is to provide a refractory shape of low thermal conductivity which substantially reduces the energy expended in the manufacture of the refractory as well as the energy lost through the water-cooled pipes comprising the pipe network in the metallurgical furnace.

Another object of the present invention is to provide an interlocking ceramic fiber refractory shape which reduces the labor required to install the refractory shape in the furnace.

A further object of the present invention is to provide a ceramic fiber refractory easily formed by means of a perforated vacuum mold.

Yet another object of the present invention is to provide a low-density, interlocking, vacuum-formed ceramic fiber refractory in which the stresses in the interlock area are significantly reduced thereby reducing the failure in the interlock area due to fracture and fatigue.

An even further object of the present invention is to provide a low-density, ceramic fiber refractory in which the crushing forces of the refractory upon a fiber blanket positioned between the pipe and the refractory are substantially reduced.

These and other objects and advantages of the present invention will become apparent when read in light of the drawings, specification and claims herebelow.

BRIEF DESCRIPTION OF THE DRAWINGS

FIG. 7 is an exploded view in perspective showing another embodiment of the present invention in which two parallel pipes are insulated with a substantially elliptical refractory.

DESCRIPTION OF THE PREFERRED EMBODIMENT

Structure

Figure 1:
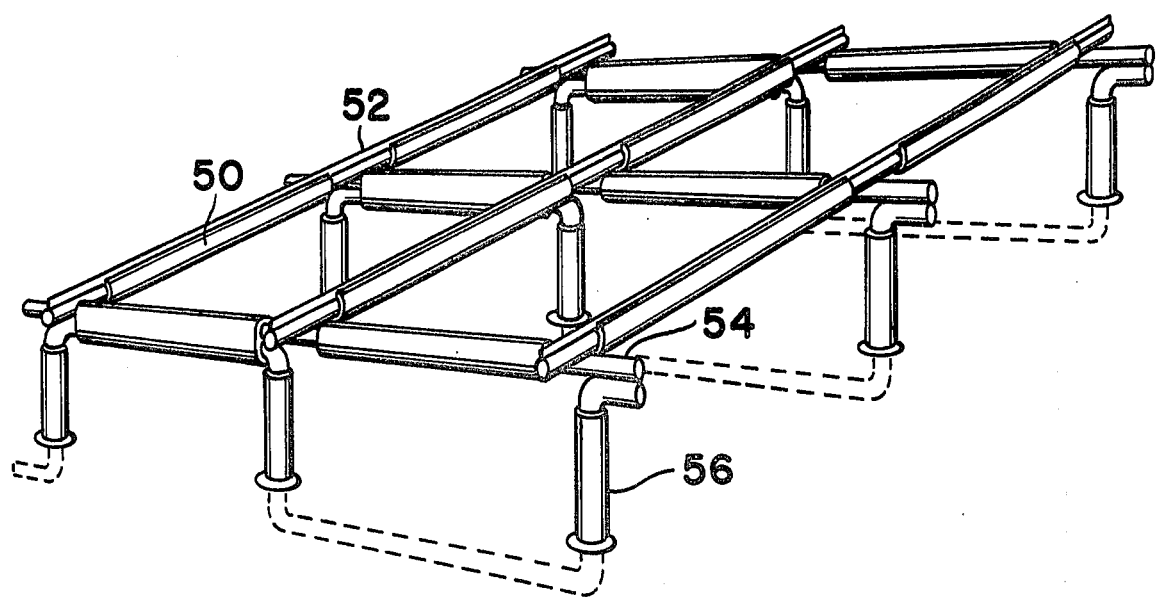
FIG. 1 is a perspective view of a typical water-cooled pipe network utilized in a metallurgical furnace.
Figure 2:
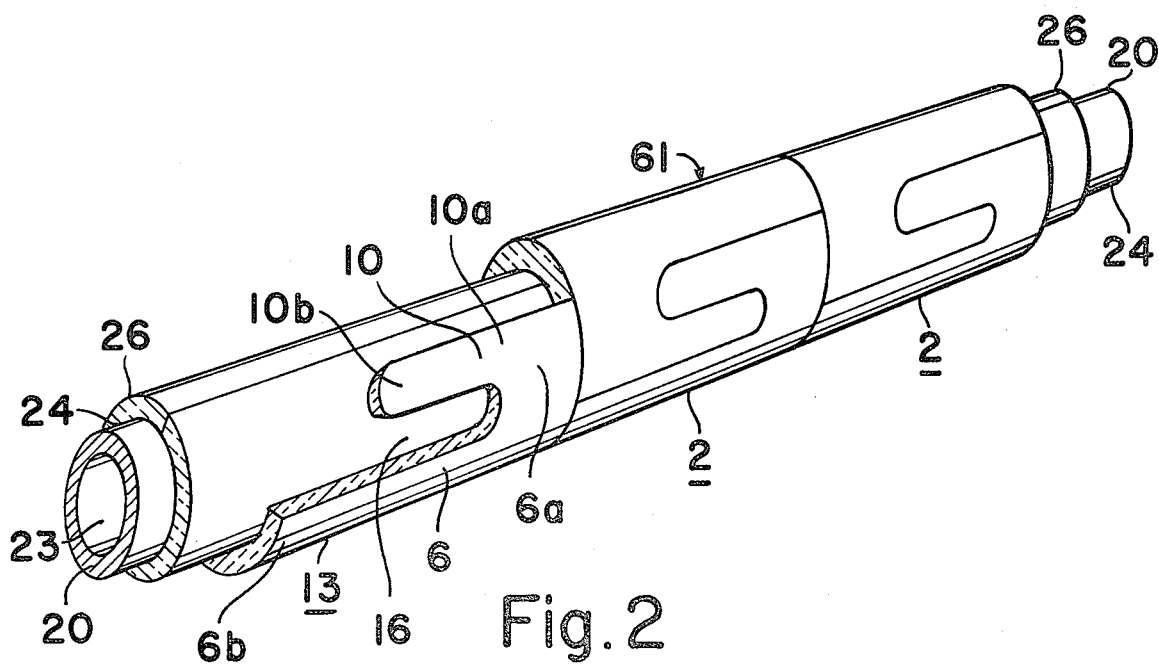
FIG. 2 is a perspective view of the present invention showing a water-cooled pipe, a ceramic fiber blanket therearound, and the surrounding interlocking engagement of the shapes of the refractory units.

FIG. 1 diagrammatically shows a pusher type metallurgical furnace having a series of parallel skid rails 50 each having a metal strip 52 which supports the slab shape as the shape is propelled across the skid rail system. The horizontal support pipes 54 and the vertical support pipes 56 as well as the water-cooled skid rail 50 all conduct flowing water. The heat which is transferred from the interior of the furnace into the metal strip 52 is then conducted to a point outside the furnace by the water flowing in the water-cooled portion of the skid rail 50. The horizontal pipes 54 and vertical pipes 56, which form the infrastructure support system for the skid rails, also transmit heat from the furnace into water therein which flows to a point outside the furnace system. FIG. 2 shows a partially exploded view of a water-cooled pipe having two full units of the refractory 2 plus a single shape 13 in position around the pipe 20 having a cylindrical passageway 23 therethrough suitable for transporting a fluid therein. Located around the exterior surface 24 of the water-cooled pipe 20 is a layer of a conventional high-temperature pliable ceramic fiber blanket 26 which is known today in the industry. The thickness of the ceramic fiber blanket is preferably sufficient to damp the vibrations of the pipe onto the shape, but not sufficiently thick to cause an excessive radial depth of the shape to be at undesirably high temperatures. The blanket can be taped temporarily around the pipe until such time as the refractory unit 2 is applied to it. For purposes of economy, the shape can be manufactured from a blend of ceramic fibers as a single layer which will permit continuous operation in temperature ranges found in reheat furnaces, and which are sufficiently resistant to attack by slag and furnace gases.

For purposes of this disclosure, ceramic fibers which substantially retain their thermal resistance characteristics at a continuous operating temperature will be referred to by that referenced temperature; for example, 2300° F. fiber, 2600° F. fiber, 3000° F. fiber and so forth.

Each ceramic fiber shape may include proportions of a 2300° F. ceramic fiber bulk, a 2600° F. ceramic fiber bulk and/or a 3000° F. cermic fiber bulk. The precise ratios of one fiber bulk to another is a result of the furnace temperatures encountered, the allowable or desired thickness of the refractory and the preferred cost of manufacture. One acceptable 2300° F. basic fiber bulk, called Kaowool, which is manufactured by the Babcock & Wilcox Company, consists primarily of fibers having a 47.0% $Al_2O_3$ and 52.9% $SiO_2$ percent by weight composition. A 2600° F. bulk ceramic fiber product is also manufactured by the same company having a 55.0 to 44.9% by molecular weight composition of $Al_2O_3$ and $SiO_2$ respectively. An even more slag-resistant and low thermally conductive 3000° F. ceramic fiber bulk is manufactured by the Imperial Chemical Industries Ltd. having a 95.0% and 5.0% by molecular weight of $Al_2O_3$ and $SiO_2$ respectively.

The temperature range in a metallurgical reheat furnace is generally not constant. Those portions of the furnace in proximity to the burners may operate in the 2600° F. range while those sections near the flue of the furnace may be closer to the 1900° F. temperature range. Consequently, the ceramic fiber shapes near the flue can be less thermally resistant, less resistant to the high temperature corrosive gases within the furnace and hence made from a less expensive blend of fibers than those refractory shapes located near the burner section. Thus, by varying the compositional blends of the various ceramic fibers, the appropriate refractory can be installed in the corresponding areas of the furnace at a minimum of expense.

In the cooler regions of the furnace, 5% of a high temperature fiber, such as for example a 3000° F. ceramic fiber, can be blended with 95% of lower temperature fiber, for example a 2300° F. ceramic fiber, by weight to achieve reasonable temperature and slag resistant ceramic fiber refractory. Another embodiment, suitable for much of the furnace, includes a 60% to 40% by weight ratio of 3000° F. ceramic fiber to 2300° F. fiber respectively.

The resistance of the refractory to slag attack is enhanced and the porosity of the refractory is reduced by the addition of a suitable refractory granular filler to the slurry of the fibers during the vacuum-forming operation. Acceptable granular fillers can be, for example, alumina ($Al_2O_3$), zirconia ($Zr_2O$) or chromic oxide ($Cr_2O_3$). The slurry further includes a starch which tends to maintain the silica binder in a colloidal state during the forming operation. The starch, which is organic, is burned out during the subsequent curing operation thereby leaving a substantially inorganic bond.

A suitable slurry for the formation of the ceramic fiber refractory shape 13 is, by way of example and not by limitation, formed according to the following:

| | |
|---|---|
| 2300° F. ceramic fiber bulk | 4 lbs. |
| 3000° F. ceramic fiber bulk | 6 lbs. |
| colloidal silica | 1.8 lbs. |
| starch | .75 lbs. |
| water | 585 lbs. |

According to the above-noted disclosure and description, the higher the content of the alumina ($Al_2O_3$) the more resistant to temperature, slags degradation and furnace gases is the resulting ceramic fiber. Those skilled in the art realize that the ingredients of the slurry can be varied at will in order to optimize the operating characteristics of the refractory with its cost of manufacture for a given continuous operating temperature. The blend can further be varied during the vacuum forming operation in order to deposit an increasingly greater amount of $Al_2O_3$ in a direction radially outward.

Although relatively new, the procedure for vacuum-forming ceramic fiber shapes is known in the industry. According to the present invention, a slurry containing, for example, the ceramic fibers the colloidal silica, organic cationic starch and water is formed in accordance with the amounts noted below. For best results, the slurry is agitated or stirred in order to assist in the maintenance of the colloidal state within the slurry. A perforated cylindrical male mold (not shown) whose perforations are in communication with a partial vacuum source, is inserted into the slurry. The colloidal silica medium, the starch and the water within the slurry are drawn through the perforations by the vacuum effect. The ceramic fibers, however, are significantly long and generally do not pass through the perforations of the mold. Hence, the ceramic fibers tend to form a mat around the perforated vacuum mold. The mat around the perforated vacuum mold is more dense when nearest the mold and is less dense as it is formed radially outwardly and away from the mold. By varying the amount of vacuum applied to the perforations of the mold, the density, and to some degree the rigidity, of the mat can be varied. When the desired thickness of the ceramic fiber layer has been deposited on the perforated vacuum mold in the slurry, the mold is removed from the slurry. The inner surface being closest to the vacuum source, exhibits a textured screen-like appearance. The outer surface being farther from the vacuum source, is rougher in appearance and is called the bark surface. The perforated vacuum mold is then withdrawn from the slurry. The perforated vacuum mold is then removed from the ceramic fiber which substantially comprises the refractory shape. The refractory 2 is then positioned on a suitable mandrel shape (not shown) and cured. The refractory 2 is cured in a temperature range of approximately 180° F. through 500° F. for a period of four to eight hours. Forced convection in the curing oven will minimize the curing time.

Figure 3:
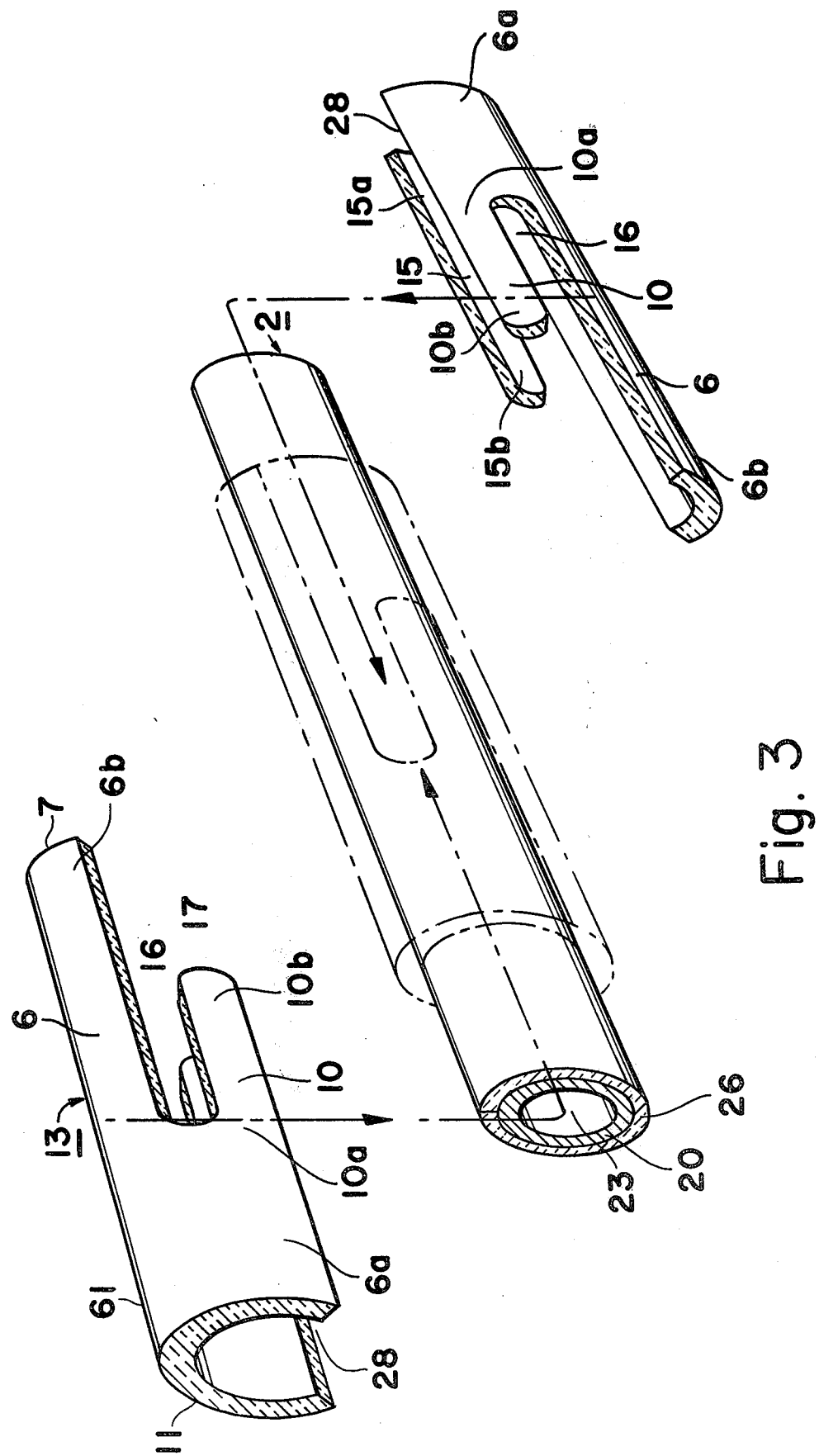
FIG. 3 shows an exploded view in perspective of the interlocking shapes of the refractory further showing the method of interlocking the shapes.
Figure 4:
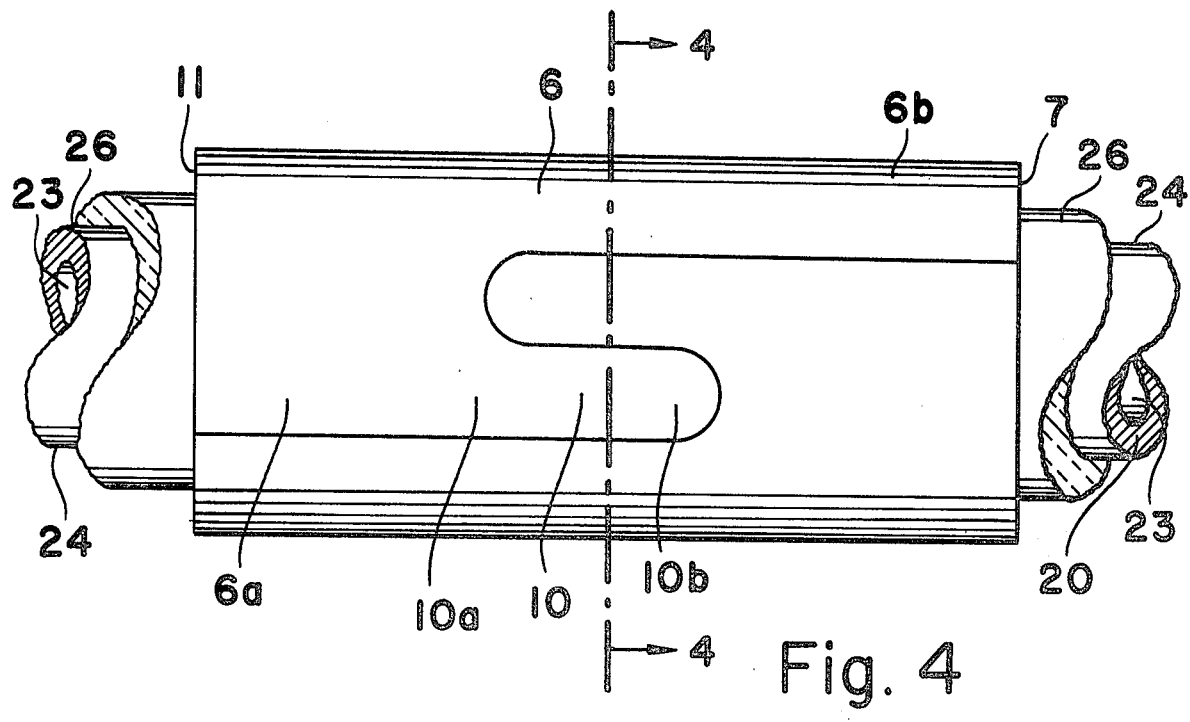
FIG. 4 is a side elevational view of the present invention generally showing the seams defined by the protuberances, recesses, body segments and voids of two interlocked shapes and further showing the curved ends of the protuberances.
Figure 5:
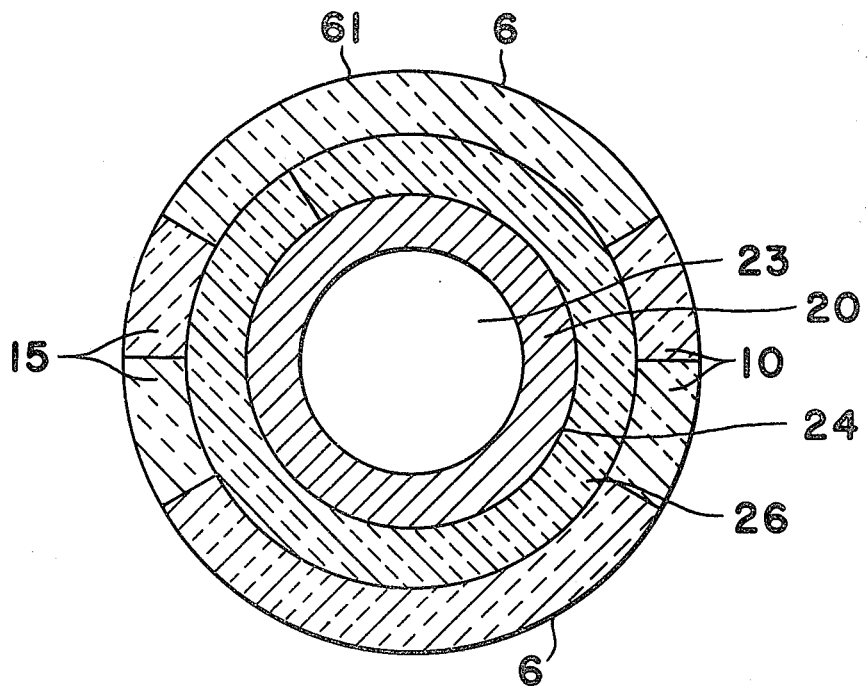
FIG. 5 is a cross-section along lines 4—4 generally showing the radial relationship among the pipe, ceramic fiber blanket and the interlocked ceramic fiber shapes.
Figure 6:
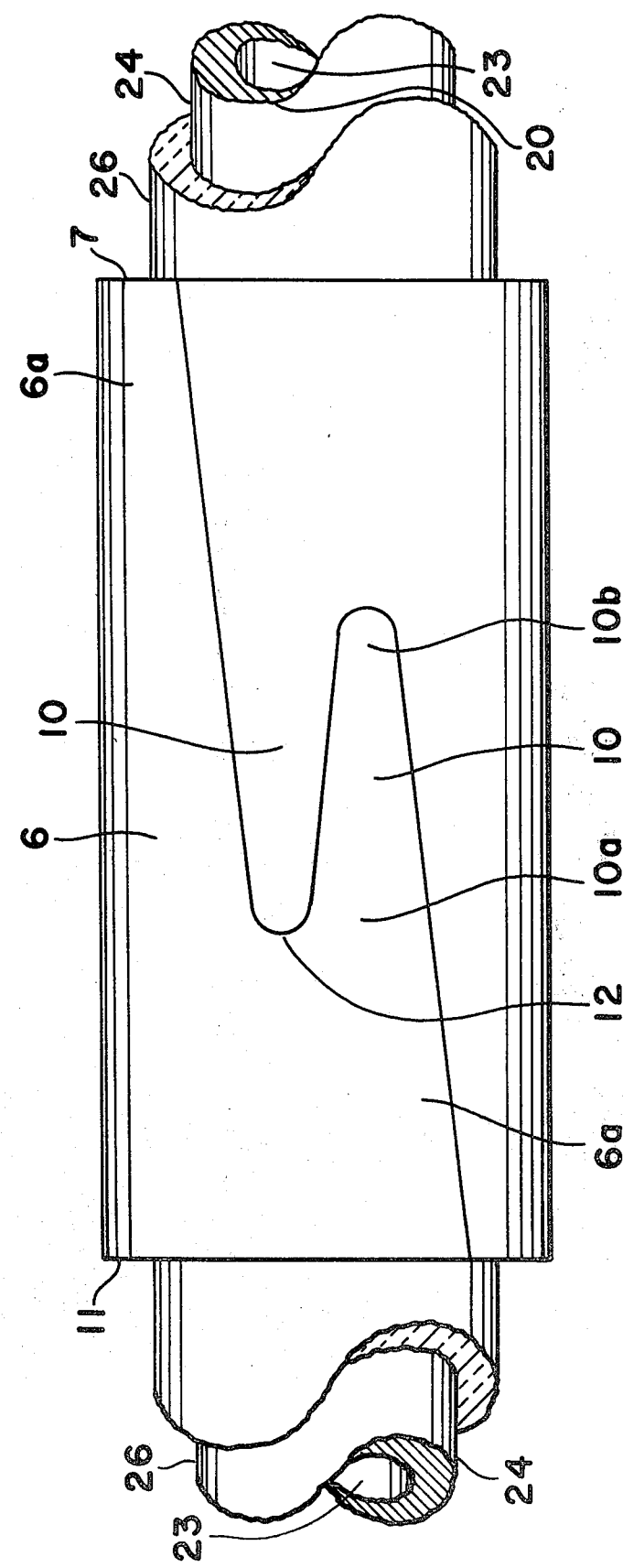
FIG. 6 is a side elevational view of another embodiment of the present invention showing the tapered protuberances, the curved ends of the protuberances and the corresponding curved portion of the tapered recesses.

As shown in FIG. 2, the refractory unit 2 includes two substantially identical shapes 13. Each shape has a partially cylindrical body segment 6 having a first end 6a and a second end 6b. A pair of protuberances 10 and 15 each has a first end 10a and 15a respectively which are integral with and extend from the first end 6a of the body segment, and second ends 10b and 15b respectively as shown in FIG. 3. The protuberances 10 and 15 are angularly spaced apart from the main body 6 by the recesses 16 and 19. For each shape 13, the body segment 6, the recesses 16 and 19, and the protuberances 10 and 15 lie within a substantially common cylindrical surface of rotation. The protuberances 10 and 15 are further spaced apart from one another by a void 28. As shown in FIG. 6, the protuberances 10 and 15, and the body segment 6 of each shape 13 can be conformingly tapered. The tapering of the protuberances and the body segments offers the additional feature of insuring a more intimate fit of the protuberances 10 and 15 with the recesses 16 and 19 as they are received within the recesses. The more intimate fit can be obtained by overinserting the two shapes 13 into an interlocking, abutting relationship and then cutting the end surfaces of the refractory unit 2 so that the end surfaces 7 of each shape 13 are substantially aligned with the surfaces 11 when the shapes 13 are interlocked.

The ends 10b and 15b of the protuberances 10 and 15 respectively can be curved or arcuate in order to reduce the stresses which are concentrated at a corner where two surfaces meet. Preferably, each shape 13 is substantially identical. Accordingly, when one shape 13 is rotated around a lateral axis 180° from the other as shown in FIG. 3 and both are aligned along a common longitudinal axis, one shape is closely received by the other to form a substantially cylindrical, interlocking refractory unit 2. The seams which are defined by the interlocking portions of the refractory unit 2 are substantially closed and resistant to the entry of slag and high-velocity convection which occurs within a metallurgical furnace. In the preferred embodiment, the water-cooled pipe is first wrapped with a pliable ceramic fiber blanket 26 which is taped around the pipe 20. A first shape 13 of the refractory 2 is positioned upon the surface of the water-cooled pipe 20 which is wrapped with the ceramic fiber blanket 26. The second shape 13 is properly aligned to facilitate the longitudinal engagement of the interlocking protuberances 10 and 15 with the recesses 16 and 19. The two shapes 13 are then urged radially inwardly in order to compress the pliable ceramic fiber blanket and then pushed longitudinally toward one another in order to effectuate the interlock and to minimize the seams between the two shapes 13. Repetition of the above-noted procedure is continued until the desired length of refractory units cover the water-cooled pipe 20. As junctions between horizontal and vertical pipes are reached, reduced lengths of the shapes 13 can be used in order to minimize the remaining exposed segments of the water pipe 20.

Because of the construction of the pipe structure within a metallugical furnace, there are areas in which two independent and aligned pipes are in proximity to one another. A modification to the basically cylindrical construction of the present invention as shown in FIG. 7 will suffice in the insulation of these pipes. The basic cylindrical shape is modified to a more oval or elliptical shape such that the pair of parallel pipes can be wrapped in a ceramic fiber blanket and then encapsulated with the more elongated ceramic fiber refractory. It is understood that several numbers and arrangements of pipes can be insulated according to the present invention with an appropriately vacuum-molded ceramic fiber refractory.

Those skilled in the art will realize that the application of a suitable high-temperature slurry coating material such as air or heat-setting mortar to the outer surface 61 of the shape 13 will enhance the slag resistance of the shape. By way of example, and not by way of limitation, one such surface coating is manufactured by A. P. Green Refractories Co. according to the approximate chemical analysis:

| | |
|---|---|
| $SiO_2$ | 1.0–2.0% |
| $Al_2O_3$ | 88–90% |
| $Na_2O + K_2O$ | .1–3% |
| $Fe_2O_3$ | .05–.2% |
| MgO | .05–.2% |
| $Cr_2O_3$ | 9.0–10.0% |

The resulting compound is a high temperature protective coating providing an additional degree of surface hardness, resistance to slag penetration, and resistance to erosion of the ceramic fiber. Another coating, which is self-curing, contains 95% $ZrO_2$ which can also be applied cold.

Method of Manufacture

Although relatively new, the procedure for vacuum-forming ceramic fiber shapes is well known in the industry. According to the present invention, the slurry containing, for example, the ceramic fibers the colloidal silica, organic cationic starch and water is formed in accordance with the amounts noted heretofor. For best results, the slurry is agitated or stirred in order to assist in the maintenance of the colloidal state within the slurry. A perforated cylindrical male mold (not shown) whose perforations are in communication with an inner partial vacuum source, is inserted into the slurry. The colloidal silica medium, the starch and the water within he slurry are drawn through the perforations by the vacuum effect. The ceramic fibers, however, are significantly long and generally do not pass through the perforations of the mold. Hence, the ceramic fibers tend to form a mat of interlaced ceramic fibers around the perforated vacuum mold. The mat around the perforated vacuum mold is generally more dense when nearest the mold and is less dense as it is formed radially outwardly from the mold. By varying the amount of vacuum applied to the perforations of the mold, the density, and to some degree the rigidity, of the mat can be varied. When the desired thickness of the ceramic fiber layer has been deposited on the perforated vacuum mold in the slurry, the mold is removed from the slurry. The inner surface of the refractory, being closest to the vacuum source, exhibits a textured screen-like appearance. The outer surface, being farther from the vacuum source, is rougher in appearance and is called the bark surface. The bark surface can be, but is not necessarily required to be, smooth. The perforated vacuum mold is then removed from the combination of the deposited ceramic fiber refractory. The refractory is then positioned on a suitable mandrel shape (not shown) and cured. The refractory is cured in a temperature range of approximately 180° F. through 500° F. for a period of four to eight hours. Forced convection in the curing oven will minimize the curing time. The refractory can either be molded by individual shapes 13, or molded as a unit 2 and cut into two substantially shapes 13.

The new ceramic fiber refractory not only saves energy by reducing the heat loss within a metallurgical furnace, but also substantially reduces the energy requirement to cure the refractory itself. For example, dense prefired ceramic refractories have generally required curing at a temperature of 2700° F. Approximately sixteen hours are required to fire a furnace to 2700° F. The conventional preburned ceramic refractories have then been cured at 2700° F. for six to eight hours. The furnace has then slowly been cooled from 2700° F. to ambient temperature and the fired refractories have then been removed from the furnace. The total time involved has been thirty to forty hours and the energy required to produce the requisite temperatures has been immense. Conversely, the manufacture of the new interlocking, vacuum-formed ceramic fiber refractory requires an average of only six hours in a continuous oven process at a temperature of 180° through 500° F. Hence, the energy saving during the manufacturing process of the refractory itself is substantial.

In order to insure an intimate fit around the pipe within the furnace, the refractory unit 2 preferably includes the radially aligned end surfaces 7 and 11 in order to minimize the seams between the installed units 2.

In the preferred embodiment, the void 28 is sufficiently large to receive a longitudinally aligned pipe 20. It is realized that the longer the interlock portion of the shape 13, that is those portions of the refractory generally defined by the interlocking recesses 16, 19 and the protuberances 10 and 15 of each shape, the more effective is the resulting interlocking action, stability of the shape 2 around the blanket 26 and the pipe 24. The tapering of the protuberances and conforming recesses further reduces penetration through the seams by the slag and corrosive gases. Because of the remarkably improved weight characteristics of the new interlocking, vacuum-formed ceramic fiber refractory as compared to fire brick or tiles, the weight per lineal foot has been reduced to 3 to 6 pounds as opposed to the thirty-five to forty pounds per lineal foot for the conventional prefired ceramic refractory tile. Hence, the weight and stress placed upon the water-cooled infrastructure is significantly reduced, and the loads and stresses on the protuberances 10 and 15 are reduced thereby reducing in turn the fractures and failures in those areas. The reduced weight per lineal foot of the present invention substantially reduces the crushing effect of the shape 13 on the blanket 26 when the blanket is maintained in compression inside the unit 2, and permits quick installation without additional support means. The resiliency of the new refractory permits it to withstand impact to a far greater degree than conventional refractories.

It is understood by those skilled in the art that the present invention is suitable for application as a process pipe insulation such as those insulations used in the petroleum or utility industry.

The resulting new and improved refractory greatly reduces heat loss through water-cooled pipes in a metallurgical furnace. For example, in a furnace operating between 2400° F. and 2500° F., the approximate following heat losses occur:

| | Btu/lineal foot/hour |
|---|---|
| bare pipe | 117,500 |
| prefired ceramic tile | 13,640 |
| interlocking vacuum-formed ceramic fiber | 1,735 |

It is clear, therefore, that the new and useful invention of an interlocking, vacuum-formed ceramic fiber refractory fulfills the obects and advantages of the present invention as well as others which are abundantly clear in light of the claims. For purposes of the disclosure, a preferred embodiment has been described and claimed. It is understood, however, that other substantial equivalents, adaptations, modifications and combinations of the present invention directly fall within both the spirit and the scope of the specification, drawings and claims herein.

What is claimed is:

1. A light weight, vacuum formed ceramic fiber refractory unit having two interlocking shapes for insulating a pipe within a high temperature environment comprising:
   a. an arcuate body segment having first and second ends and extending longitudinally the length of the shape,
   b. a pair of arcuate protuberances each having first and second ends, said protuberances extending longitudinally less than the body segment (a), the first end of each said protuberance integrally connected to a portion of the first end of the body segment,
   c. a pair of recesses angularly displacing their corresponding protuberances (b) oppositely from the body segment (a), said recesses extending circumferentially and longitudinally equally to the protuberances;
   d. a void arcuately displacing each protuberance and a corresponding integral portions of the first end of the body segment from one another so that the two shapes are longitudinally aligned and conformingly urged together to form the refractory unit, and
   e. a support means to maintain said unit around the pipe consisting of an interlocking relationship of the body segment with the conforming void and of the protuberances with the conforming recesses of the refractory unit.

2. The device of claim 1 wherein the interlocking shapes form a substantially ovular refractory unit suitable for insulating at least two pipes therein.

3. The device of claim 1 or 2 wherein the protuberances are tapered inwardly in the direction toward the second end thereof, and the corresponding recesses are conformingly tapered so that when one shape is interlocked within another, the shapes intimately abut one another.

4. The device of claim 1 or 2 wherein the body segment converges toward the second end thereof and the void is conformingly tapered so that when a first shape is interlocked with the second shape, said shapes are in intimate contact with one another.

5. The device of claim 1 or 2 wherein the second ends of the protuberances are arcuate and the recesses which receive the protuberances are conformingly configured thereby reducing the concentration of stresses in the area of the recesses.

6. The device of claim 1 or 2 wherein the refractory includes at least 50% $Al_2O_3$ by weight.

7. The device of claim 1 or 2 wherein the percent by weight of $Al_2O_3$ within the refractory increases in a radially outwardly direction.

8. The device of claims 1 or 2 wherein the refractory includes a blend of a first ceramic fiber having at least 95% by weight of $Al_2O_3$ with a second less thermally resistant ceramic fiber having at least 47% by weight of $Al_2O_3$ in a ratio of 3:2 by weight respectively.

9. A light weight, vacuum formed ceramic fiber refractory unit having two interlocking shapes for insulating a pipe within a high temperature environment comprising:
   a. an arcuate body segment having first and second ends, and extending axially the length of the shape, said arcuate body segment converging in the direction of the second end thereof,
   b. a pair of arcuate protuberances disposed circumferentially on either side of the body segment each having first and second ends wherein:
      (i) the first end extends axially from and is integrally formed with the first end of the body segment,
      (ii) the protuberances extend axially less than the body segment,
      (iii) the protuberances converge in the direction of the second end thereof; and
      (iv) the second end of the protuberances are arcuate, c. a pair of recesses circumferentially spacing the protuberances from the body segment, said recesses closely conforming to the shape of the protuberances, d. a void extending axially the length of the body segment, said void circumferentially spacing the protuberances from one another and closely conforming to the shape of the second end of the body segment whereby the shapes fit conformingly around the pipe to form the unit, and e. a support means to maintain said unit around said pipe consisting of an interlocking relationship of the body segment with the conforming void and of the protuberances with the conforming recesses of the refractory unit.

10. The device of claim 9 wherein the unit is a partial oval or ellipse for insulating at least two pipes therein.

* * * * *

UNITED STATES PATENT OFFICE
CERTIFICATE OF CORRECTION

Patent No. 4,304,267    Dated December 8, 1981

Inventor(s) Frank Campbell, Jr.

It is certified that error appears in the above-identified patent and that said Letters Patent are hereby corrected as shown below:

In claim 1, part (d), second line, "portions" should read --portion-- .

Signed and Sealed this

Fifth Day of July 1983

[SEAL]

Attest:

GERALD J. MOSSINGHOFF

Attesting Officer    Commissioner of Patents and Trademarks